(12) United States Patent
Heil

(10) Patent No.: US 10,102,692 B2
(45) Date of Patent: Oct. 16, 2018

(54) AERODYNAMIC SYSTEM AND METHOD FOR DIAGNOSING THE AERODYNAMIC SYSTEM AND VERIFYING DOWNFORCE ESTIMATION USING A FORCE SENSOR

(71) Applicant: GM GLOBAL TECHNOLOGY OPERATIONS LLC, Detroit, MI (US)

(72) Inventor: Edward T Heil, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 15/252,885

(22) Filed: Aug. 31, 2016

(65) Prior Publication Data

US 2017/0092022 A1 Mar. 30, 2017

Related U.S. Application Data

(60) Provisional application No. 62/232,809, filed on Sep. 25, 2015.

(51) Int. Cl.
*G07C 5/08* (2006.01)
*B62D 37/02* (2006.01)
*B62D 35/00* (2006.01)

(52) U.S. Cl.
CPC ......... *G07C 5/0808* (2013.01); *B62D 35/005* (2013.01); *B62D 35/007* (2013.01); *B62D 37/02* (2013.01)

(58) Field of Classification Search
CPC ...... G07C 5/0808; B62D 37/02; B62D 35/00; B62D 35/005–35/02
See application file for complete search history.

(56) References Cited

U.S. PATENT DOCUMENTS

2016/0129951 A1* 5/2016 Park .................... G05D 3/20
296/180.5
2016/0355219 A1* 12/2016 Cooper ................ B62D 35/007

FOREIGN PATENT DOCUMENTS

| CN | 101054003 A | 10/2007 |
|---|---|---|
| CN | 101612637 A | 12/2009 |
| CN | 101708743 A | 5/2010 |
| CN | 101786122 A | 7/2010 |
| CN | 103057605 A | 4/2013 |

(Continued)

OTHER PUBLICATIONS

Hodanbosi et al., Lift Formula, 1996, NASA, https://www.grc.nasa.gov/www/k-12/WindTunnel/Activities/lift_formula.html (Year: 1996).*

(Continued)

*Primary Examiner* — Spencer D Patton
(74) *Attorney, Agent, or Firm* — Quinn IP Law

(57) ABSTRACT

A method can be executed to diagnose an aerodynamic system of a vehicle and includes the following steps: (a) determining, via a controller, an expected downforce acting on an aerodynamic element of a vehicle based, at least in part, on a position of the aerodynamic element relative to a vehicle body of the vehicle; (b) determining, via the controller, a measured downforce based, at least in part, on a signal received from at least one force sensor; (c) determining a deviation, via the controller, based, at least in part, on the expected downforce and the measured aerodynamic force; and (d) controlling, via the controller, the aerodynamic element based, at least in part, on the deviation.

16 Claims, 4 Drawing Sheets

(56) References Cited

FOREIGN PATENT DOCUMENTS

| | | |
|---|---|---|
| CN | 104670348 A | 6/2015 |
| CN | 204507042 U | 7/2015 |
| DE | 3623188 C1 | 9/1987 |
| EP | 0529244 A1 | 3/1993 |
| JP | 2005021945 A | 1/2005 |
| JP | 2015039934 A | 3/2015 |
| KR | 101470252 BI | 12/2014 |

OTHER PUBLICATIONS

Katz et al., "Aerodynamic Effects of Indy Car Components," Dec. 2002, Society of Automotive Engineers (Year: 2002).*

* cited by examiner

AERODYNAMIC SYSTEM AND METHOD FOR DIAGNOSING THE AERODYNAMIC SYSTEM AND VERIFYING DOWNFORCE ESTIMATION USING A FORCE SENSOR

CROSS-REFERENCE TO RELATED APPLICATION

The present application claims priority to, and the benefit of, U.S. Provisional Patent Application 62/232,809, filed on Sep. 25, 2015, the entire disclosure of which is incorporated herein by reference.

TECHNICAL FIELD

The present disclosure relates to an aerodynamic system for a vehicle and a method for diagnosing the aerodynamic system and verifying a downforce estimation.

BACKGROUND

Some vehicles include aerodynamic elements. These aerodynamic elements are part of the vehicle aerodynamic system and can affect vehicle aerodynamic factors, such as vehicle drag, wind noise, vehicle noise emissions, and lift forces.

SUMMARY

The present disclosure relates to a method of diagnosing an aerodynamic system of a vehicle and verifying a downforce estimation. The vehicle aerodynamic system includes at least one aerodynamic element, such as a wing, coupled to the vehicle body. The presently disclosed method estimates and measures the downforce acting on the aerodynamic element, thereby increasing the level of confidence in the reported aerodynamic conditions of the vehicle in comparison with conventional vehicles. This increased level of confidence allows other vehicle controllers to use this downforce information, thereby enhancing the vehicle performance by providing the driver with an improved handling under, for example, racetrack conditions.

In one embodiment, the method includes the following steps: (a) determining, via a controller, an expected downforce acting on the aerodynamic element based, at least in part, on a position of the aerodynamic element relative to a vehicle body; (b) determining, via the controller, a measured downforce acting on the aerodynamic element based, at least in part, on a signal received from at least one force sensor; (c) determining a deviation, via the controller, based, at least in part, on the expected downforce and the measured downforce; and (d) controlling, via the controller, the aerodynamic element based, at least in part, on the deviation.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
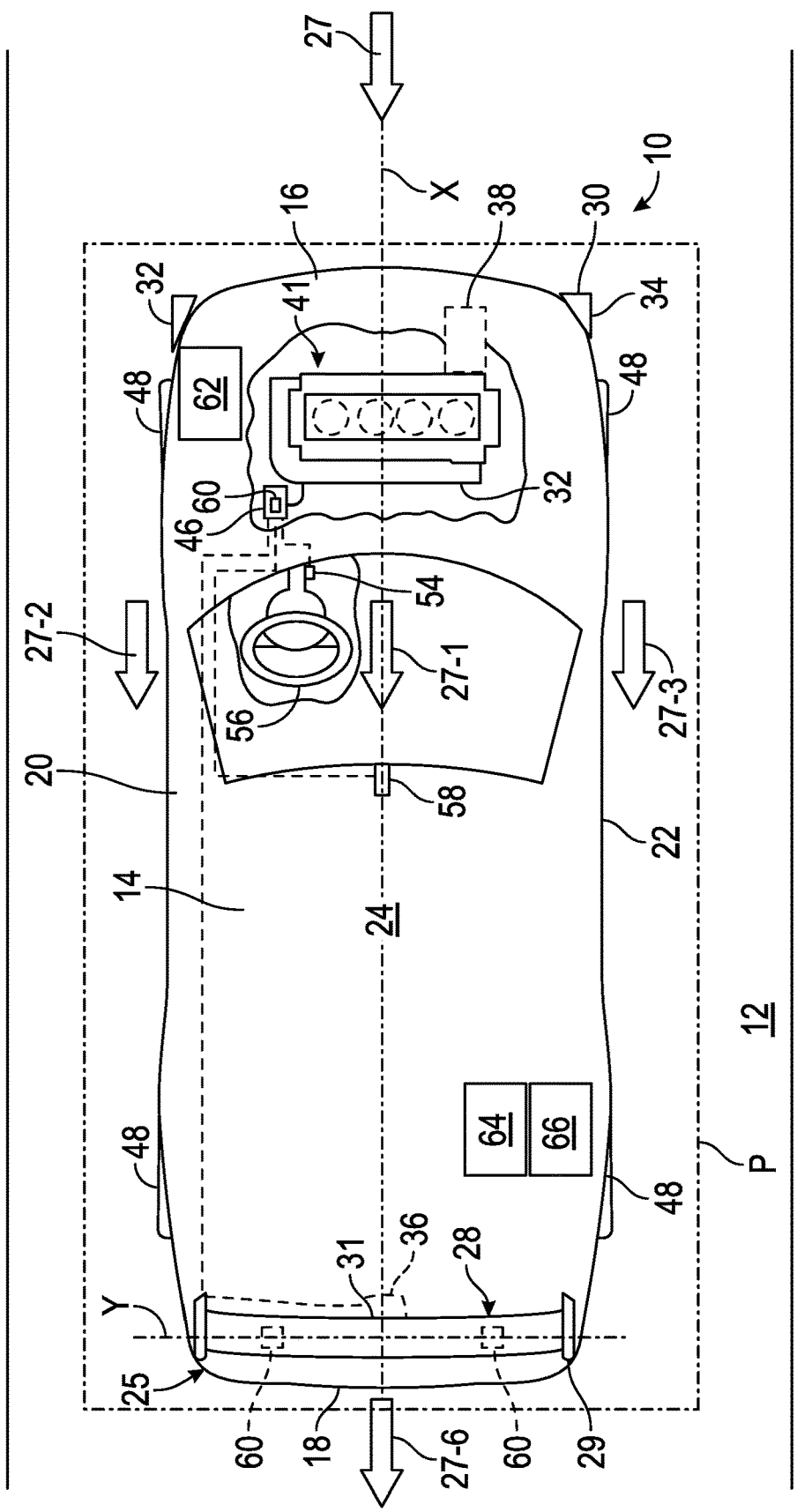
FIG. 1 is a schematic top view of a vehicle in accordance with an embodiment of the present disclosure.
Figure 2:
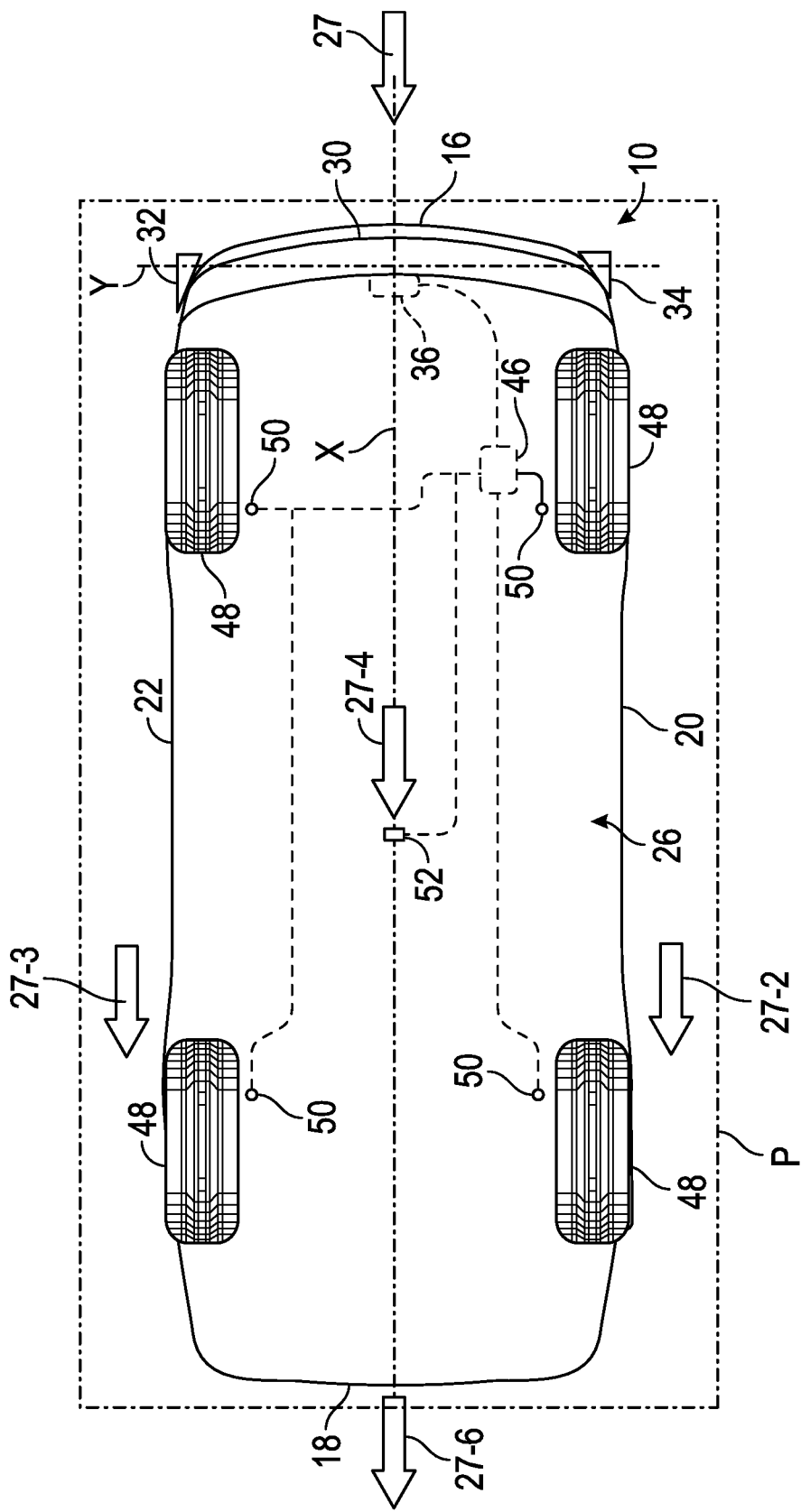
FIG. 2 is a schematic bottom view of the vehicle shown in FIG. 1 in accordance with an embodiment of the present disclosure.
Figure 3:
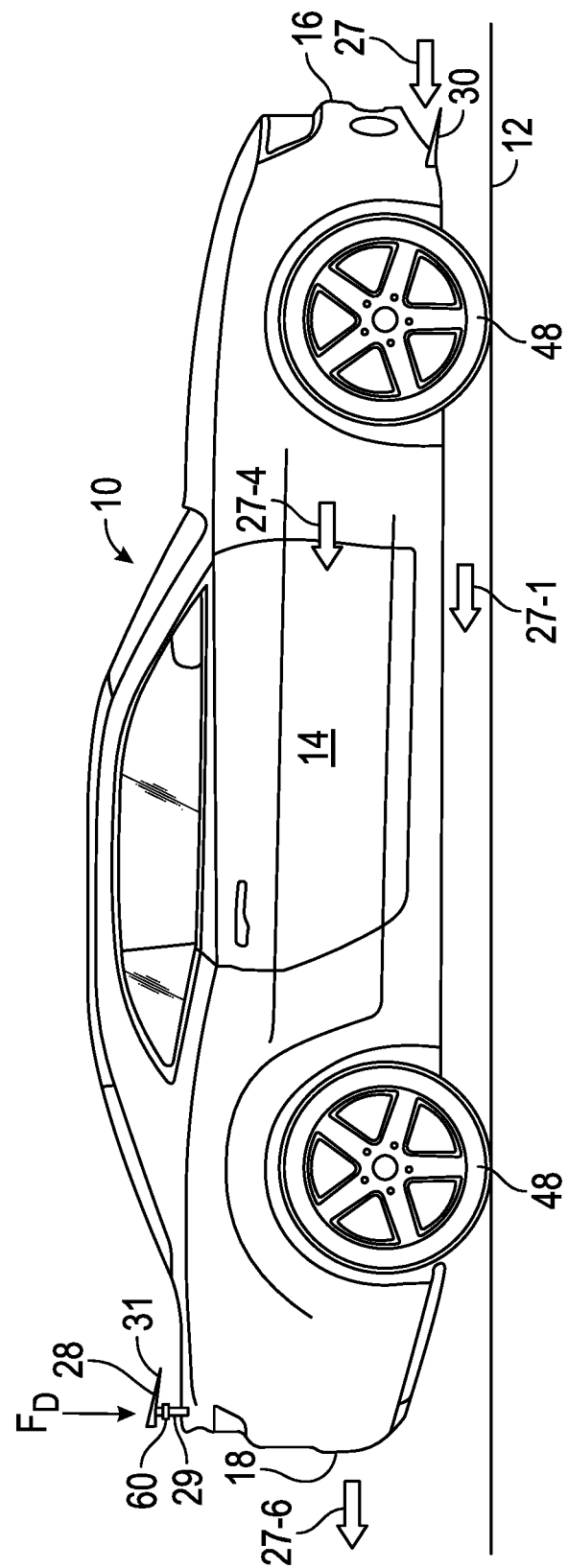
FIG. 3 is a schematic side view of the vehicle shown in FIGS. 1 and 2 in accordance with an embodiment of the present disclosure.

Referring to the drawings, wherein like reference numbers refer to like components, FIG. 1 shows a top schematic view, FIG. 2 shows a bottom schematic view, and FIG. 3 shows a side schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26. The vehicle 10 includes a drivetrain having a power plant 41 that mechanically couples via a geartrain to one or a plurality of road wheels 48 to transfer mechanical power thereto. The power plant 41 may be an internal combustion engine (shown in FIG. 1), a hybrid-electric powertrain (not shown), or another alternative type of power plant, and the geartrain may be an automatic transmission or another suitable geartrain. The motor vehicle 10 may be any suitable motor vehicle, including, by way of non-limiting examples, a passenger vehicle, a high-performance vehicle, an off-road vehicle, an autonomous vehicle, and a military-use vehicle.

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides 20, 22 of the vehicle body 14. The front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into a first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in FIG. 2) passes under the vehicle body 14, between the underbody portion 26 and the road surface 12. The recirculating airflow region 27-6 is generally caused at elevated vehicle speeds by the flow of surrounding air around the six body sides of the vehicle body 14.

The vehicle 10 includes an active aerodynamic system 25 including at least a first or rear aerodynamic assembly 28. The first aerodynamic assembly 28 includes an aerodynamic element 31, such as a wing, arranged along an aerodynamic element axis Y and configured to control movement of the ambient airflow 27 along the vehicle body 14. The aerodynamic element 31 may be wing-shaped. "Wing-shaped" is herein defined as having a shape of a wing, i.e., a fin having a shape of an airfoil defined by a streamlined cross-sectional shape producing lift for flight or propulsion through a fluid. Moreover, the aerodynamic element 31 may be formed from a suitably rigid but low mass material, such as an engineered plastic or aluminum, for structural stability. As can be seen in FIG. 1, the aerodynamic element axis Y may be positioned transversely (e.g., perpendicular) to the longitudinal body axis X. Additionally, the aerodynamic element axis Y is also arranged substantially parallel to the body plane P. The first aerodynamic assembly 28 may be connected to the vehicle body 14 via one or more stanchions 29 or any other suitable support structure. The first aerodynamic assembly 28 varies a downforce $F_D$ exerted by the ambient airflow 27 at the rear of the vehicle 10. The term "downforce" means a force component that is perpendicular to the direction of relative motion of the vehicle 10, i.e., in the longitudinal direction, toward the road surface 12. The term "downforce" is also known as a negative aerodynamic lift force acting on the vehicle body 14, which causes additional normal forces on the tires.

Figure 4:
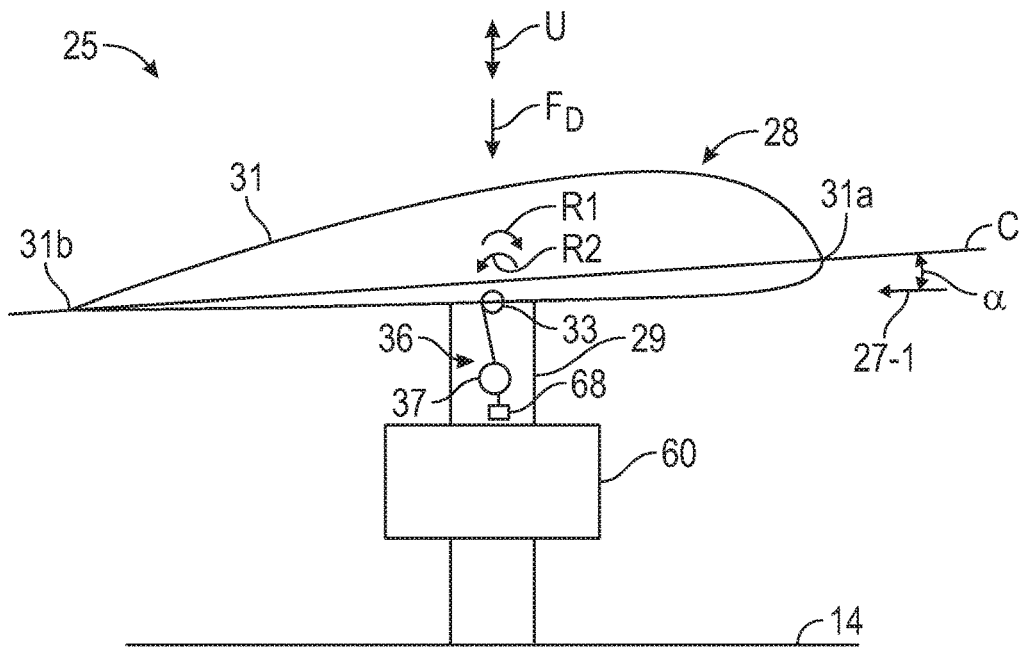
FIG. 4 is a schematic, partial side view of a vehicle body, an aerodynamic element coupled to the vehicle body, and a force sensor coupled between the aerodynamic element and the vehicle body.

Referring to FIG. 4, the first aerodynamic assembly 28 also includes a first actuation mechanism 36 configured to adjust the position of the aerodynamic element 31 relative to the vehicle body 14. Although the drawings show the first actuation mechanism 36 in the rear of the vehicle 10, it is contemplated that the first actuation mechanism 36 may alternatively be located in the front of the vehicle 10 or any other part of the vehicle 10. In the depicted embodiment, the first actuation mechanism includes an actuator 37, such as an electric motor, coupled to the aerodynamic element 31. As such, upon receipt of a control signal, the actuator 37 can move the aerodynamic element 31 relative to the vehicle body 14. For instance, a hinge 33 may rotationally couple the stanchions 29 to the aerodynamic element 31, thereby allowing the aerodynamic element 31 to rotate in the rotational directions R1 and R2 relative to the vehicle body 14 when the actuator 37 is activated. By rotating the aerodynamic element 31 relative to the vehicle body 14, an angle of attack α of the aerodynamic element 31 can be adjusted. The "angle of attack α" means the angle between the first airflow portion 27-1 of the ambient airflow 27 and chord line C of the aerodynamic element 31. The "chord line C" refers to a virtual straight line joining the leading edge 31a and the trailing edge 31b of the airfoil defined by the aerodynamic element 31. In addition or alternatively, the actuator 37 can allow the aerodynamic element 31 to move toward and away from the vehicle body 14 in the directions indicated by double arrow U.

In addition to the first aerodynamic assembly 28, the aerodynamic system 25 may include a second or front aerodynamic assembly 30, which may function as an air dam (also known as a Gurney flap) that varies a downforce exerted by the ambient airflow 27 at the front of the vehicle. The Gurney flap could be positioned at the back part of the wing, which is the front underbody area in the front of the tires. The second aerodynamic assembly 30 may be employed to increase the downforce at the front of the vehicle, whereas the first aerodynamic assembly 28 mounted on the rear end 18 may be employed to increase the downforce $F_D$ at the rear of the vehicle 10 in order to increase vehicle traction. The second aerodynamic assembly 30 may be formed from a suitably rigid but low mass material, such as an engineered plastic or aluminum, for structural stability. Further, the second aerodynamic assembly 30 may include a first, left winglet 32 and a second, right winglet 34, each arranged substantially transversely with respect to aerodynamic element axis Y and each arranged substantially vertically relative to the road surface 12 and facing the incident ambient airflow 27. As a result, the winglets 32, 34 facilitate trapping pockets of air when the vehicle 10 is in motion. A second or front actuation mechanism 38 is configured to alter the position of the front first and second winglets 32, 34 in response to a control signal. For example, the second actuation mechanism 38 can selectively shift each of the first winglet 32 and the second winglet 34 in a direction substantially transverse to the longitudinal body axis X, and thereby adjust a magnitude of the aerodynamic downforce generated by the second aerodynamic assembly 30. Movements of the first and second winglets 32, 34 may be facilitated by linear actuators, rotary actuators, and/or electric motors (not shown in detail, but understood by those skilled in the art).

The vehicle 10 includes a plurality of sensors for monitoring vehicle operation related to vehicle ride and handling. A plurality of first sensors 50 may be arranged on the vehicle body 14 for detecting rotating speeds of each road wheel 48 (shown in FIG. 2). Each first sensor 50 may also be configured to communicate the detected rotating speed of the respective road wheel 48 to a controller 46, while the controller 46 can be configured to correlate the data received from the respective first sensors 50 to road speed of the vehicle 10. The vehicle 10 may also include one or more second sensors 52 (shown in FIG. 2) configured to detect a yaw moment or rate on the vehicle body 14 relative to the road surface 12 and communicate the detected yaw rate to the controller 46. The second sensors 52 may also be referred to as yaw sensors. Additionally, the vehicle 10 may include a third sensor 54 operatively connected to a steering wheel 56 (shown in FIG. 1) and configured to detect an angle of the steering wheel 56 during operation of the vehicle. An intended direction of the vehicle 10 may be identified by the steering wheel angle detected by the third sensor 54 and communicated to the controller 46. The vehicle 10 may additionally include a fourth sensor 58 (shown in FIG. 1) configured to detect a velocity of ambient airflow 27 relative to the vehicle 10. The fourth sensor 58 may be additionally configured to communicate the detected velocity of the ambient airflow 27 to the controller 46. The fourth sensor 58 may be, for example, a pitot tube configured to detect a pressure of the ambient airflow 27 at a specific location relative to the vehicle body 14. The controller 46 can correlate the measured pressure to airflow velocity. The vehicle 10 additionally includes a group of fifth sensors 60 configured to measure the downforce $F_D$ exerted by the ambient airflow 27 on the vehicle 10. Accordingly, the fifth sensors 60 are also referred to as force sensors. The fifth sensors 60 are also configured to communicate the measured downforce $F_D$ to the controller 46. In the depicted embodiment, the fifth sensors 60 are coupled to the first aerodynamic assembly 28. For instance, the fifth sensors 60 may be directly coupled to the stanchions 29. It is envisioned that the vehicle 10 may include only one fifth sensor 60. The vehicle 10 further includes a group of sixth sensors 68

(shown in FIG. 4) configured to detect the position of the aerodynamic element 31 relative to the vehicle body 14. Accordingly, the sixth sensors 68 are also referred to as position sensors. The sixth sensors 68 can also communicate the position of the aerodynamic element 31 relative to the vehicle body 14 to the controller 46. It is contemplated that the vehicle 10 may include only one sixth sensor 68. The aforementioned sensors are each in communication (e.g., electronic communication) with the controller 46 and may be in the form of rotational position sensors, linear position sensors, ultrasonic sensors, laser sensors and inertial-based acceleration sensors. A heading angle calculation may be determined from a pitot tube or other vehicle dynamics information providing inertial estimates. An air density calculation may be derived from manifold absolute pressure and outside air temperatures.

The vehicle 10 includes one or a plurality of systems for actively controlling vehicle ride and handling. This may include one or more routines for controlling position(s) of the front and rear aerodynamics 30, 28. The systems may include an active suspension system 62 that is configured to adjust suspension damping and/or front and rear ride heights in response to a control signal that is based upon operating conditions. The vehicle 10 may include an active braking system 64 that may include anti-lock braking and other features. The vehicle 10 may include an active steering system 66 that may control vehicle steering rates in response to operating conditions.

The controller 46 is an electronic device that is configured, i.e., constructed and programmed, to regulate the first actuation mechanism 36. The controller 46 may be configured as a central processing unit (CPU) that is also configured to regulate operation of the power plant 41, or, alternatively, a dedicated controller. In order to appropriately control operation of the first actuation mechanism 36, the controller 46 includes a processor and at least one memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 46 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 46 may also include a floppy disk, a flexible disk, hard disk, magnetic tape, any other magnetic medium, a CD-ROM, DVD, any other optical medium, etc. The controller 46 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 46 or accessible thereby may be stored in the memory and automatically executed to provide the required functionality.

The controller 46 may also be configured to regulate the second actuation mechanism 38 and may be a dedicated controller or have functions that are integrated into another controller. In order to appropriately control operation of the second actuation mechanism 38, the controller 46 includes a memory, at least some of which is tangible and non-transitory. The memory may be any recordable medium that participates in providing computer-readable data or process instructions. Such a medium may take many forms, including but not limited to non-volatile media and volatile media.

The controller 46 may selectively control one or more of the first actuation mechanism 36, the second actuation mechanism 38, the active suspension system 62, the active braking system 64, and the active steering system 66 in response to the yaw rate detected by the second sensor 52. Furthermore, the controller 46 may be configured to control one or more of the first actuation mechanism 36, the second actuation mechanism 38, the active suspension system 62, the active braking system 64, and the active steering system 66 in response to the rotating speeds of the road wheels 48 detected via the first sensor 50 and/or the velocity of the ambient airflow 27 detected via the fourth sensor 58. The controller 46 may be additionally programmed to determine a slip of the vehicle 10 relative to the road surface 12. The slip of the vehicle 10 may include a measure of how much each of the road wheels 48 has slipped in a direction that is generally perpendicular to the longitudinal vehicle axis X, which identifies that the vehicle 10 has deviated from the intended direction or path along the road surface 12 as identified by the steering wheel angle detected by the third sensor 54. The controller 46 may be programmed to compare the determined steering wheel angle and yaw rate to determine how much the vehicle 10 has deviated from its intended direction or path.

Overall, controlling an active vehicle suspension system includes determining expected vehicle aerodynamic responses associated with a plurality of controlled vehicle parameters. The expected vehicle aerodynamic responses may be employed during vehicle operation, including determining actual vehicle parameters during vehicle operation and dynamically estimating a vehicle aerodynamic response during the vehicle operation based upon the expected vehicle aerodynamic responses associated with the controlled vehicle parameters. Control parameters associated with the yaw influencing controllers may be dynamically controlled in response to the dynamically estimated vehicle aerodynamic response to actively control parameters related to vehicle ride and handling.

Figure 5:
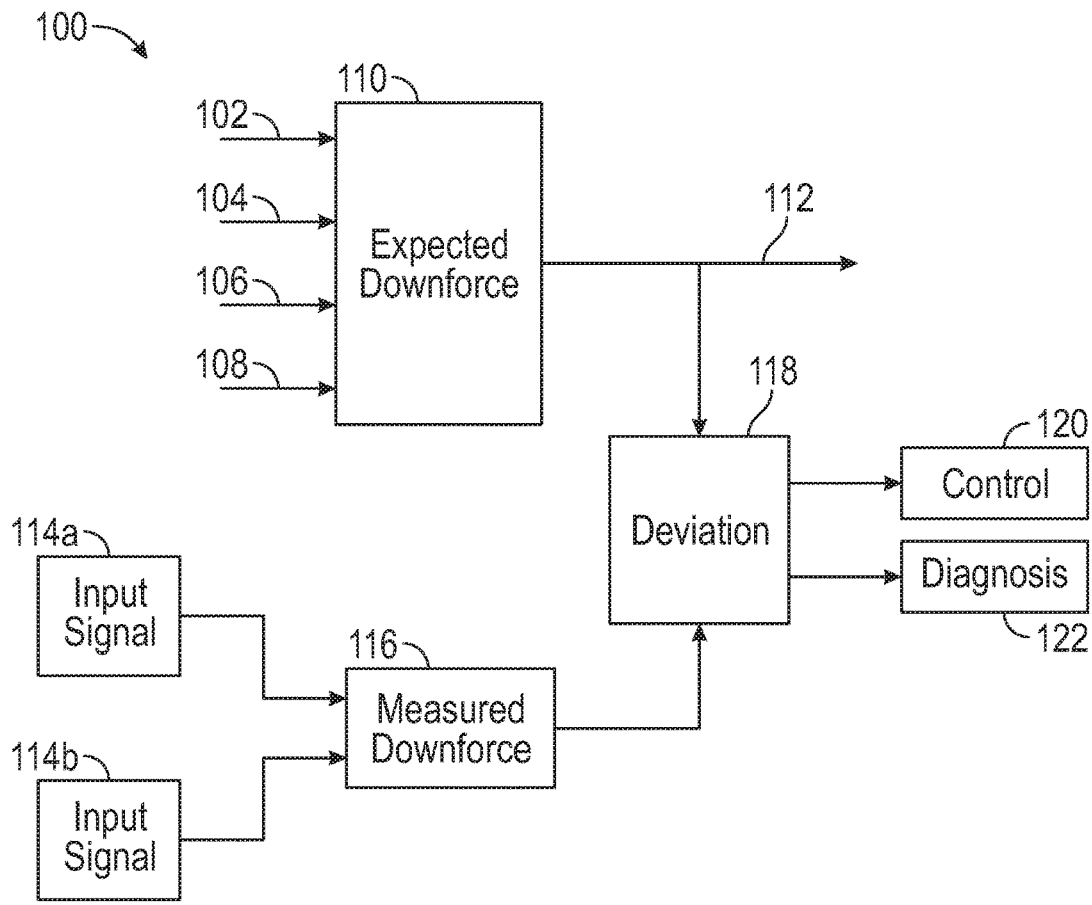
FIG. 5 is a schematic flowchart of a method for diagnosing the aerodynamic system shown in FIG. 1 and verifying downforce estimation.

FIG. 5 schematically illustrates a method 100 for diagnosing the aerodynamic system 25 and verifying downforce estimation. In particular, the method 100 includes instructions (or steps), which may be stored on and executed by the controller 46. In other words, the controller 46 is specifically programmed to execute the method 100. As discussed below, the method 100 estimates and measures the downforce $F_D$ acting on the aerodynamic element 31, thereby increasing the level of confidence in the reported aerodynamic force in comparison to a vehicle that does not employ a direct method for estimating the aerodynamic downforce. This increased level of confidence allows other vehicle controllers to use this downforce information, thereby enhancing the vehicle performance by providing the driver with an improved handling under, for example, racetrack conditions.

The method 100 includes a plurality of input steps 102, 104, 106, and 108, which may be executed simultaneously or in any suitable chronological order. At step 102, the controller 46 receives an input signal indicative of the position of the aerodynamic element 31 relative to the vehicle body 14. In the depicted embodiment, the sixth sensors 68 (i.e., the position sensors) communicate a signal indicative of the position of the aerodynamic element 31 to the controller 46. Based on this input signal, the controller 46 determines the position of the aerodynamic element 31 relative to the vehicle body 14. Thus, step 102 also entails determining, via the controller 46, the position of the aerodynamic element 31 based on, for example, an input signal generated by the sixth sensors 68.

At step 104, the controller 46 receives an input signal indicative of the vehicle velocity. This input signal may be generated by the first sensors 50, which can measure the rotating speeds of each road wheel 48. Therefore, in the depicted embodiment, the controller 46 can determine the vehicle velocity based, at least in part, on the input signal received from the first sensors 50. Thus, step 104 also entails determining, via the controller 46, the vehicle speed based on, for example, an input signal generated by the first sensors 50.

At step 106, the controller 46 receives an input signal indicative of a vehicle ride height estimation. The vehicle ride height estimation may be determined using experimental results based on vehicle operating factors, such as the drag force acting on the vehicle, the air density, and the air velocity. A method of using chassis position sensors can also be utilized, as described in U.S. Provisional Patent Application No. 62/220,010, filed on Sep. 17, 2015, the entire disclosure of which is incorporated by reference herein. By way of a non-limiting example, the vehicle 10 may be evaluated in a wind tunnel to experimentally derive an aerodynamic characteristic map of the subject vehicle that may be subsequently employed. A wind tunnel simulates movement of air around a vehicle under controlled wind speed, temperature and other conditions to determine magnitudes of forces acting upon the vehicle with the vehicle controlled under various parameters. Such parameters include front and rear vehicle ride height, pitch, roll, heading angle, air velocity, vehicle velocity, and position(s) of one or more aerodynamic actuators such as front and rear aerodynamic elements. An empirical model may be developed, which includes, for example, a multi-level full factorial matrix for evaluating the subject vehicle. At step 106, the controller 46 employs this empirical model to determine (e.g., estimate) the vehicle ride height. An example of a suitable empirical model for estimating vehicle ride height is described in U.S. Provisional Patent Application No. 62/220,010, filed on Sep. 17, 2015, which is incorporated by reference herein in its entirety.

At step 108, the controller 46 receives input signals indicative of other aerodynamic factors, such as air density, roll, pitch, yaw and heading angle. The air density calculation may be derived from manifold absolute pressure and outside air temperatures. A heading angle calculation may be determined from a pitot tube or other vehicle dynamics information providing inertial estimates. Therefore, the controller 46 can determine the heading angle based, at least in part, on input signals from the fourth sensor 58. As discussed above, the fourth sensor 58 may be, for example, a pitot tube configured to detect a pressure of the ambient airflow 27 at a specific location relative to the vehicle body 14. The controller 46 can determine vehicle pitch and roll based, at least in part, on input signals from the third sensor 54. An example of a suitable empirical model for determining vehicle roll and pitch is described in U.S. Provisional Patent Application No. 62/220,010, filed on Sep. 17, 2015, which is incorporated by reference herein in its entirety. As discussed above, the third sensor 54 can detect an angle of the steering wheel 56 during operation of the vehicle 10 and can therefore be referred as the steering sensors. The controller 46 can determine the vehicle yaw based, at least in part, on input signals from the second sensors 52. As discussed above, the second sensors 52 can detect a yaw moment or rate on the vehicle body 14 relative to the road surface 12 and communicate the detected yaw rate to the controller 46.

After executing steps 102, 104, 106, and 108, the method 100 proceeds to step 110. At step 110, the controller 46 determines (e.g., estimates) an expected downforce acting on the aerodynamic element 31 based, at least in part, on the position of the aerodynamic element 31 relative to the vehicle body 14, the vehicle velocity, the vehicle ride height, as well as other aerodynamic factors, such as air density, roll, pitch, yaw and heading angle. In other words, the controller 46 determines the expected downforce acting on the aerodynamic element 31 based, at least in part, on the input signals received in steps 102, 104, 106, and 108. To do so, the controller 46 employs an empirically developed vehicle model. This vehicle model may be derived, for example, by subjecting the vehicle 10 to wind tunnel experimentation as discussed above. The wind tunnel simulates movement of air around a vehicle under controlled wind speed, temperature and other conditions to determine magnitudes of forces acting upon the vehicle 10, such as the downforce, with the vehicle controlled under various parameters. After determining expected downforce acting on the aerodynamic element 31, the method 100 proceeds to step 112.

At step 112, the controller 46 communicates the expected downforce acting on the aerodynamic element 31 to other vehicle controllers. For example, the expected downforce can be communicated to vehicle controllers that influence the vehicle yaw (i.e., yaw influencing controllers), such as an Electronic Stability Control (ESC) system. These other vehicle controllers can employ the expected downforce acting on the aerodynamic element 31 to enhance vehicle performance.

The method 100 further includes steps 114a and 114b. At step 114a, the controller 46 receives an input signal from one of the force sensors (e.g., the fifth sensors 60). As discussed above, this input signal is indicative of a measured downforce $F_D$. Moreover, at step 114b, the controller 46 receives an input signal indicative of a measured downforce $F_D$ from another fifth sensor 60 (i.e., another force sensor). Although the depicted embodiment shows that the controller 46 receives downforce measurements from two force sensors (i.e., fifth sensors 60), it is contemplated that the controller 46 may receive more or fewer input signals indicative of downforce measurements. Then, the method 100 continues to step 116.

At step 116, the controller 46 determines the measured downforce $F_D$ based, at least in part, on the input signals received from the force sensors (i.e., the fifth sensors 60). The controller 46 may calibrate all the downforce measurements received from the force sensors (i.e., fifth sensors 60) in order determine (or at least estimate) a cumulative downforce $F_D$ acting on the aerodynamic element 31. As discussed above, the term "downforce" means a force component that is perpendicular to the direction of relative motion of the vehicle 10, i.e., in the longitudinal direction, toward the road surface 12. After determining the expected downforce (at step 110) and the measured downforce $F_D$ (at step 116), the method 100 proceeds to step 118.

At step 118, the controller 46 determines a deviation between the expected downforce determined in step 110 and the measured downforce $F_D$ determined in step 116 (i.e., the force deviation). In one embodiment, the controller 46 subtracts the expected downforce from the measured downforce $F_D$ to determine the deviation between the expected downforce determined and the measured downforce $F_D$. Then, the method 100 continues to step 120.

At step 120, the controller 46 controls the operation of the aerodynamic element 31 based, at least in part, on the force deviation determined in step 118. For instance, the controller 46 can command the first actuation mechanism 36 to adjust the position of the aerodynamic element 31 relative to the vehicle body 14 based on the force deviation determined in step 118. As a non-limiting example, the controller 46 can compare the force deviation (determined in step 118) with a first predetermined threshold and a second predetermined threshold which is greater than the first predetermined threshold. If the force deviation is less than the first predetermined threshold (i.e., the measured downforce is low), then the controller 46 commands the first actuation mechanism 36 to adjust the position of the aerodynamic element 31 in order to increase the downforce $F_D$ acting on the aerodynamic element 31. In doing so, the first actuation mechanism 36 can increase or decrease the angle of attack α of the aerodynamic element 31. Further, if the force deviation is greater than the second predetermined threshold (i.e., the measured downforce is high), then the controller 46 commands the first actuation mechanism 36 to adjust the position of the aerodynamic element 31 in order to decrease the downforce $F_D$ acting on the aerodynamic element 31.

Moreover, after determining the force deviation in step 118, the method 100 also executes step 122. At step 122, the controller 46 provides a diagnosis status to other vehicle controllers based on the force deviation. For instance, another controller can limit the vehicle speed based on the force deviation communicated by the controller 46. Further, a sensitive electronic stability control (ESC) can be activated, if it was disabled, based on the force deviation, and/or the ESC can modify the vehicle dynamic models based on the force deviation. The force deviation can also be used, by the controller 46 or other vehicle controllers, to verify the downforce estimation determined in step 110.

At step 118, the controller 46 may also define a force estimate diagnostic flag. The force estimate flag is a computer logic flag indicating whether the controller 46 has determined if the estimated downforce from the current vehicle operating conditions is or is not a valid estimate of the downforce $F_D$ acting on the vehicle 10 at the aerodynamic element 31. The controller 46 may pass the force estimate diagnostic flag onto the other vehicle control systems so that they may control their respective vehicle systems more accurately. The force estimate diagnostic flag may be defined as valid when the deviation is equal to or less than a maximum allowable value. The force estimate diagnostic flag may be defined as non-valid when the deviation is greater than the maximum allowable value. The maximum allowable value may be defined based on the specific vehicle performance characteristics, or some other criteria, and represents an allowable range for the estimated downforce from current vehicle operating conditions.

While the best modes for carrying out the teachings have been described in detail, those familiar with the art to which this disclosure relates will recognize various alternative designs and embodiments for practicing the teachings within the scope of the appended claims.

The invention claimed is:

1. A method, comprising:
   determining, via a controller, an expected downforce acting on an aerodynamic element of a vehicle based, at least in part, on a position of the aerodynamic element relative to a vehicle body of the vehicle, wherein the expected downforce is based, at least in part, on a vehicle roll;
   determining, via the controller, a measured downforce acting on the aerodynamic element based, at least in part, on a signal received from at least one force sensor;
   determining a deviation, via the controller, based, at least in part, on the expected downforce and the measured downforce; and
   controlling, via the controller, the aerodynamic element based, at least in part, on the deviation.

2. The method of claim 1, wherein the expected downforce is based, at least in part, on a vehicle velocity.

3. The method of claim 1, wherein the expected downforce is based, at least in part, on a vehicle ride height.

4. The method of claim 1, wherein determining the deviation includes subtracting the expected downforce from the measured downforce.

5. The method of claim 1, further comprising commanding an actuation mechanism to adjust a position of the aerodynamic element relative to the vehicle body.

6. The method of claim 5, further comprising commanding the actuation mechanism to adjust the position of the aerodynamic element relative to the vehicle body when the deviation is less than a first predetermined threshold.

7. The method of claim 6, further comprising commanding the actuation mechanism to adjust a position of the aerodynamic element relative to a vehicle body when the deviation is greater than a second predetermined threshold, wherein the second predetermined threshold is greater than the first predetermined threshold.

8. The method of claim 1, further comprising communicating the deviation to other controllers.

9. The method of claim 1, further comprising providing diagnosis status to other controllers based on the deviation.

10. A vehicle, comprising:
   a vehicle body;
   an aerodynamic element movably coupled to the vehicle body;
   a force sensor operatively coupled to the aerodynamic element such that the force sensor is configured to detect a measured downforce acting on the aerodynamic element;
   a controller in communication with the force sensor, wherein the controller is programmed to:
      determine an expected downforce acting on the aerodynamic element based, at least in part, on a position of the aerodynamic element relative to the vehicle body;
      determine a measured downforce acting on the aerodynamic element based, at least in part, on a signal received from the force sensor;
      determine a deviation based, at least in part, on the expected downforce and the measured downforce;
      control the aerodynamic element based, at least in part, on the deviation;
   wherein the vehicle further includes an actuation mechanism coupled between the vehicle body and the aerodynamic element, the actuation mechanism is configured to adjust the position of the aerodynamic element relative to the vehicle body, and the controller is programmed to command the actuation mechanism to adjust the position of the aerodynamic element relative to the vehicle body;
   wherein the controller is programmed to command the actuation mechanism to adjust the position of the aerodynamic element relative to the vehicle body when the deviation is less than a first predetermined threshold; and wherein the controller is programmed to command the actuation mechanism to adjust the position of the aerodynamic element relative to the vehicle body when the deviation is greater than a second predetermined threshold, and the second predetermined threshold is greater than the first predetermined threshold.

11. The vehicle of claim 10, wherein the expected downforce is based, at least in part, on a vehicle velocity.

12. The vehicle of claim 10, wherein the expected downforce is based, at least in part, on a vehicle ride height.

13. The vehicle of claim 10, wherein the expected downforce is based, at least in part, on a vehicle roll.

14. The vehicle of claim 10, wherein the controller is programmed to subtract the expected downforce from the measured downforce to determine the deviation.

15. The vehicle of claim 10, wherein the controller is programmed to communicate the deviation to other controllers.

16. The vehicle of claim 10, wherein the controller is programmed to provide a diagnosis status to other controllers based on the deviation.

* * * * *